United States Patent
Raghavarao et al.

[11] Patent Number: 6,090,295
[45] Date of Patent: Jul. 18, 2000

[54] METHOD AND APPARATUS FOR ACOUSTICALLY DEMIXING AQUEOUS SOLUTIONS

[75] Inventors: Karumanchi S. M. S. Raghavarao; Paul W. Todd, both of Boulder, Colo.

[73] Assignee: University Technology Corporation, Boulder, Colo.

[21] Appl. No.: 09/132,171

[22] Filed: Aug. 11, 1998

[51] Int. Cl.[7] .................... C02F 1/36; B01O 17/04
[52] U.S. Cl. ................. 210/748; 204/157.15
[58] Field of Search .................. 210/748, 634, 210/708; 204/157.15, 157.42

[56] References Cited

U.S. PATENT DOCUMENTS

| | | | |
|---|---|---|---|
| 3,614,069 | 10/1971 | Murry | 366/119 |
| 3,645,504 | 2/1972 | Jacke | 366/118 |
| 3,954,119 | 5/1976 | Kunioka et al. | 137/92 |
| 4,280,823 | 7/1981 | Szonntagh | 210/748 |
| 4,302,112 | 11/1981 | Steenstrup | 366/114 |
| 4,491,491 | 1/1985 | Stumpf | 156/73.3 |
| 4,542,745 | 9/1985 | Oakley et al. | 252/312 |
| 5,164,094 | 11/1992 | Stuckart | 210/748 |
| 5,527,460 | 6/1996 | Trampler et al. | 210/198.1 |
| 5,538,628 | 7/1996 | Logan | 210/748 |
| 5,626,767 | 5/1997 | Trampler et al. | 210/748 |
| 5,711,888 | 1/1998 | Trampler et al. | 210/748 |
| 5,951,456 | 9/1999 | Scott | 204/157.42 |

FOREIGN PATENT DOCUMENTS 2098498  11/1982  United Kingdom .

*Primary Examiner*—David A. Simmons
*Assistant Examiner*—Frank M. Lawrence
*Attorney, Agent, or Firm*—Emery L. Tracy

[57] ABSTRACT

A method and apparatus for demixing an aqueous solution is provided. The aqueous solution has at least two aqueous phases. The method comprises applying acoustic energy to the aqueous solution. The apparatus comprises a mechanism for applying acoustic energy to the aqueous solution until the aqueous solution is demixed to clarity.

8 Claims, 1 Drawing Sheet

METHOD AND APPARATUS FOR ACOUSTICALLY DEMIXING AQUEOUS SOLUTIONS

BACKGROUND OF THE INVENTION

1. Field of the Invention

This invention relates generally to a method and apparatus for demixing aqueous solutions and, more particularly, it relates to a method and apparatus for demixing aqueous solutions which enhances the demixing rate by the application of acoustic energy to the aqueous solution.

2. Description of the Prior Art

Methods for the separation, concentration, and purification of biological products such as proteins, enzymes, viruses, cells, and other biological materials from fermentation and other cell culture media are well known in the art. Methods currently in use to separate two-phase aqueous systems at equilibrium include gravity settling, centrifugation, chromatography, and electrokinetic demixing. These methods have significant disadvantages that make these methods unsuitable for large-scale use.

In an aqueous two-phase systems method, a dissolved chemical product is extracted by partitioning the dissolved chemical product into one of the two immiscible liquid phases (aqueous solutions of two polymers or a polymer and a salt). Aqueous two-phase systems require the phases to be mechanically mixed and then allowed to separate. Since these aqueous phases are characterized by high viscosities, low interfacial tensions, and similar densities between the two liquid phases, a slow demixing of the liquid phases occurs. Due to the slowness of the separation and the cost of the phase-forming chemical components required, the aqueous two-phase systems method has not been accepted for wide industrial application.

Concerning the other methods of separation, demixing by gravity settling is very slow. Centrifugation demixing is prohibitively expensive on a large scale. Electrokinetic demixing requires the use of special equipment and the addition of salts to the system. Therefore, from the economics point of view, due to the capital equipment and operational costs, centrifugation demixing becomes prohibitively expensive and impractical on a large scale and electrokinetic demixing requires fabrication of special equipment and chemical additions, such as salts, to the aqueous two-phase system.

Efforts have been made to overcome the inherent shortcomings of the demixing separation methods of the prior art which are developed for solidliquid systems and not liquid-liquid systems. The Trampler et al, U.S. Pat. No. 5,527,460, describes an ultrasonic resonance wavefield apparatus and method for separation of mammalian cells from a liquid medium. The transducer and mirror of the Trampler et al patent are positioned parallel to each other producing sonification in a horizontal direction. Since the gravity vector is perpendicular to the sonification, the standing resonance wavefield of the Trampler et al patent facilitates the sedimentation of the mammalian cells from the liquid medium.

Accordingly, there exists a need for a method and apparatus for demixing aqueous solutions which enhances the demixing rate of the mixed liquid phases that are at equilibrium with each other by the application of acoustic energy. Additionally, a need exists for a method and apparatus for acoustically demixing aqueous solutions which has reduced capital and operational costs as compared to other demixing methods and processes.

SUMMARY OF THE INVENTION

The present invention is a method for demixing an aqueous solution. The aqueous solution has at least two aqueous phases. The method comprises applying acoustic energy to the aqueous solution.

In an embodiment of the present invention, the acoustic energy applied to the aqueous solution is in a predetermined selected range of frequency and power. Preferably, the acoustic energy applied to the aqueous solution has an intensity between approximately four (4) $W/cm^2$ and approximately six (6) $W/cm^2$. Alternatively, the acoustic energy applied to the aqueous solution has an intensity of less than approximately four (4) $W/cm^2$. Preferably, the frequency of the acoustic energy is between approximately 1.2 MHz and approximately 1.8 MHz. Alternatively, the frequency of the acoustic energy is less than approximately 1.2 MHz.

In another embodiment of the present invention, the application of acoustic energy enhances any coalescence between droplets in the two aqueous phases. Preferably, the application of acoustic energy enhances the rate of demixing of the aqueous phases due to increased velocity of the droplets in the aqueous phases.

In still another embodiment of the present invention, the aqueous phases are in equilibrium with each other.

In yet another embodiment of the present invention, the method further comprises demixing the aqueous solution to clarity.

The present invention further includes an apparatus for demixing an aqueous solution. The aqueous solution has at least two aqueous phases. The apparatus comprises means for applying acoustic energy to the aqueous solution until the aqueous solution is demixed to clarity.

In an embodiment of the present invention, the acoustic energy is in a predetermined selected range of frequency and power. Preferably, the acoustic energy applied to the aqueous solution has an intensity between approximately four (4) $W/cm^2$ and approximately six (6) $W/cm^2$. Alternatively, the acoustic energy applied to the aqueous solution has an intensity of less than approximately four (4) $W/cm^2$. Preferably, the frequency of the acoustic energy is between approximately 1.2 MHz and approximately 1.8 MHz. Alternatively, the frequency of the acoustic energy is less than approximately 1.2 MHz.

In another embodiment of the present invention, the acoustic energy enhances any coalescence between droplets in the two aqueous phases. Preferably, the acoustic energy enhances the rate of demixing of the aqueous phases due to increased coalescence of the droplets in the aqueous phases.

In still another embodiment of the present invention, the aqueous phases are in or near equilibrium with each other.

DETAILED DESCRIPTION OF THE PREFERRED EMBODIMENTS

Figure 1:
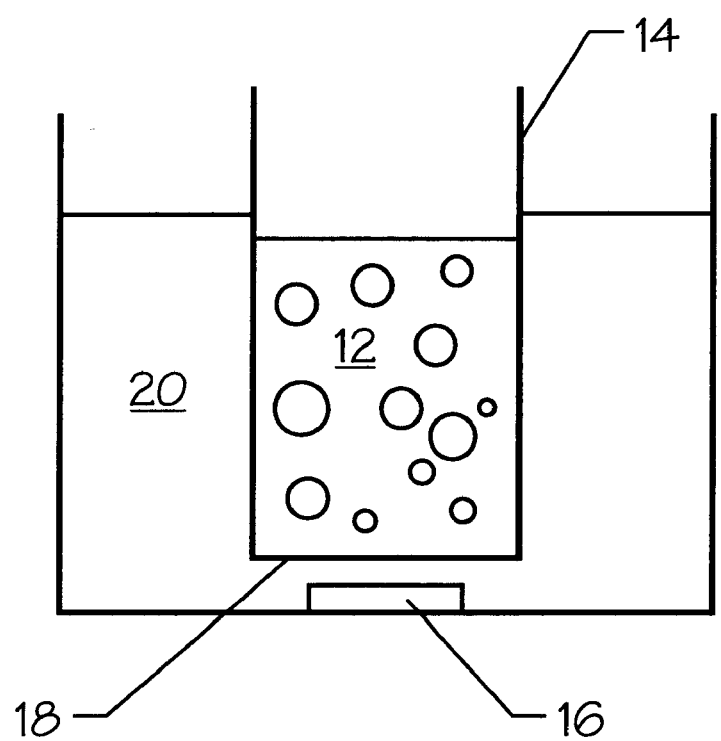
FIG. 1 is a side view illustrating a two-phase aqueous dispersion contained in a vessel suspended above a sonic transducer constructed in accordance with the present invention.

The present invention is a method and apparatus for acoustically demixing aqueous solutions having at least two well-mixed aqueous phases in equilibrium with each other. The method and apparatus of the present invention preferably comprises subjecting a well-mixed aqueous two-phase system containing one or more dissolved polymers to acoustic energy in a predetermined selected range of frequency and power. By subjecting the two-phase system to the predetermined acoustic energy in accordance with the present invention, the rate of demixing is higher than the rate of demixing in the absence of acoustics, e.g., demixing under gravity conditions alone. The demixing process of the present invention includes the application of acoustic energy enhancing the coalescence between the droplets of the dispersed liquid phase which, in turn, enhances the rate of demixing of the liquid phases due to increased buoyancy of the droplets.

The Applicants of the present invention believe that subjecting a well-mixed aqueous two-phase system to acoustic energy for demixing is novel since it is contrary to the conventional understanding of the effect of ultrasonication. Conventional wisdom predicts more mixing, as in other applications using acoustic energy, of ultrasonication such as cleaning of surfaces, inactivation of microorganisms and enzymes, disruption of cells, etc.

FIG. 1 illustrates a two-phase aqueous dispersion 12 contained in a container 14 that is suspended above a sonic transducer 16. The sonic transducer 16 transmits energy upward at the specified power density and frequency to the bottom 18 of the dispersion 12 through a water bath 20 in which the container 14 is submerged.

The demixing process and apparatus of the present invention acoustically demixes a well-mixed two-phase aqueous solution by enhancing the natural coalescence of the individual phase droplets. The acoustic demixing method provides a higher rate of phase demixing and significantly reduces the capital and operational costs normally used for liquid phase demixing. The following example is merely illustrative of the benefits of the acoustic demixing process of the present invention, and other acoustic demixing methods are within the scope of the present invention:

EXAMPLE

The inventors of the present application tested a mixed aqueous solution system using the acoustic demixing process of the present invention. In the test example, a one hundred (100 ml) milliliter two-phase system was tested consisting of the following components:

89.66% water;

4.57% polyethylene glycol; and 5.77% dextran.

Using an Ultrasonic Humidifier, Model # HM-460, manufactured by Holmes Products Corp., Milford, Massachusetts, the aqueous solution system was subjected to an application of acoustic energy of between approximately four (4) W/cm$^2$ intensity and approximately six (6) W/cm$^2$ intensity at between approximately 1.2 MHz and approximately 1.8 MHz. While the application of ultrasonication for the demixing of aqueous two-phase systems is contrary to conventional wisdom of the expected effect of ultrasonication, with the application of the acoustic energy, as in the present example, the aqueous solution system was demixed to clarity in approximately ten (10) minutes. Without the application of the acoustic energy, the aqueous solution system was demixed to clarity in approximately fifty (50) minutes.

It should be noted that the acoustic energy values of the range between approximately four (4) W/cm$^2$ intensity and approximately six (6) W/cm$^2$ intensity are approximate and roughly correspond to the settings "Lo" and "Hi" on the Ultrasonic Humidifier identified above and employed for the tests. At acoustic energy values greater than approximately six (6) W/cm$^2$ intensity, it is believed that remixing of the aqueous solution system commences.

At acoustic energy values less than approximately four (4) W/cm$^2$ intensity, enhanced demixing of the aqueous solution system was discovered. For instance, application of acoustic energy having an intensity of between approximately 0.4 W/cm$^2$ and approximately 1.0 W/cm$^2$ at a frequency of approximately fifty (50) kHz and approximately sixty (60) kHz also resulted in an increase of demixing rates of the aqueous solutions (e.g., the demixing time was reduced from fifty (50) minutes at gravity conditions to twenty-five (25) minutes under sonification). The test was conducted with a Sonicor Ultrasonic bath, Model # SC 150 M/C, Ser. # 60981-0386, 28 cm×15 cm, Sonicor Instruments Corporation, Capiague, N.Y.

Furthermore, while the acoustic frequency for the test was between approximately 1.2 MHz and approximately 1.8 MHz, such a value is a specification of the Ultrasonic Humidifier identified above and not a measured value. In fact, the acoustic frequency value utilized in the test was similar to the frequencies which many other acoustic devices are operated for other purposes. It should be noted that utilizing the acoustic demixing method of the present invention with acoustic frequency values less than approximately 1.2 MHz and acoustic frequency values greater than approximately 1.8 MHz is within the scope of the present invention.

Additionally, at this time, it should be noted that while it is generally understood that remixing occurs at acoustic energy values over approximately six (6) W/cm$^2$ intensity, it is within the scope of the present invention to have demixing at acoustic energy values over approximately six (6) W/cm$^2$ intensity depending on the types of solutions utilized in the aqueous solution system and the acoustic frequency utilized.

The Applicants of the acoustic demixing method of the present invention have demonstrated the successfulness of present acoustic demixing process for up to two hundred (200 ml) milliliters scale level in the laboratory. Due to the fact that the demixing process of the present invention is very simple and easy to scale up, the demixing process could be used for even greater quantities of solution.

As noted, a typical demixing time under gravity conditions for one hundred (100 ml) milliliters of ATPS (fifty (50) ml) milliliters top phase and fifty (50 ml) milliliters bottom phase) is approximately fifty (50) minutes. By applying centrifugation, the demixing time of the ATPS was approximately ten (10) minutes. By applying electrokinetics, the demixing time of the ATPS was approximately eleven (11) minutes. However, even though acoustic demixing required approximately the same amount of time as centrifugation demixing and a slightly lesser amount of time compared to electrokinetic demixing, the acoustic demixing process of the present invention requires far less energy than these other two methods and is, therefore, more efficient and less expensive. Furthermore, while the separation time was approximately the same with the acoustic demixing process of the present invention as compared to centrifugation demixing and electrokinetic demixing, the acoustic demixing process of the present invention does not require special equipment or addition of salts to the solutions.

While the present acoustic demixing process has some similarities to the process of electrokinetic demixing of aqueous two-phase systems, the demixing process of the present invention has distinct and novel advantages. The electrokinetic demixing process exploits the electrokinetic potential developed across the phase interface due to the unequal distribution of certain buffering ions. However, the acoustic demixing process of the present invention is independent of buffer ions and, far easier and less expensive to scale up when compared to the electrokinetic process.

The acoustic demixing process of the present invention has many applications. The major application of this acoustic demixing process of the present invention is perhaps in the bioprocessing field. Examples of bioprocessing applications include, but are not limited to, downstream processing of biomolecules such as proteins, enzymes, and the like, and in the design of a new type of continuous extractive fermentation bioreactor.

In downstream processing of biomolecules, the acoustic demixing process offers the following several distinct advantages. The advantages of the acoustic demixing process of the present invention includes enabling the overcoming of the main bottleneck in the industrial adoption of aqueous two-phase extraction which is the "slow demixing rate of equilibrated well mixed phases" and higher energy efficiency and lower cost over conventional physical processes used for phase demixing. In the downstream processing application, manufacturers of ultrasonic transducers would have an interest in the invention with biochemical processing plants being its principal users in manufacturing. Bioreactor manufacturers would further have use for the acoustic demixing process of the present invention since the acoustic demixing process can be easily integrated into an aqueous two-phase extractive fermentation bioreactor.

In any application, while employing the acoustic method and apparatus of the present invention, the advantages of high energy efficiency, low equipment cost, simplicity, and ease of scale-up are present.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. A method for demixing an aqueous solution, the aqueous solution having at least two aqueous phases, the method comprising:

providing an emulsified immiscible aqueous solution having at least two aqueous phases;

applying acoustic energy to the aqueous solution;

enhancing coalescence between droplets in the aqueous phases;

increasing the buoyancy of the droplets in the aqueous phases thereby enhancing the rate of demixing of the aqueous phases; and separating each of the aqueous phases from each other.

2. The method of claim 1 wherein the acoustic energy applied to the aqueous solution is in a predetermined selected range of frequency and power.

3. The method of claim 2 wherein the acoustic energy applied to the aqueous solution has an intensity between approximately four (4) W/cm$^2$ and approximately six (6) W/cm$^2$.

4. The method of claim 2 wherein the acoustic energy applied to the aqueous solution has an intensity of less than approximately four (4) W/cm$^2$.

5. The method of claim 2 wherein the frequency of the acoustic energy is between approximately 1.2 MHz and approximately 1.8 MHz.

6. The method of claim 2 wherein the frequency of the acoustic energy is greater than approximately 1.8 MHz.

7. The method of claim 1 wherein the aqueous phases are at least approximately near equilibrium with each other before the acoustic energy has been applied.

8. The method of claim 1 wherein the aqueous phase solutions are demixed to clarity.

* * * * *